United States Patent [19]

Brooks et al.

[11] Patent Number: 5,084,135
[45] Date of Patent: Jan. 28, 1992

[54] RECYCLING PLASTIC COATED PAPER PRODUCT WASTE

[75] Inventors: Joe G. Brooks, Springdale; Billy D. Goforth, Fayetteville; Charles L. Goforth, Lowell, all of Ark.

[73] Assignee: Advanced Environmental Recycling Technologies, Inc., Springdale, Ark.

[21] Appl. No.: 499,718

[22] Filed: Mar. 27, 1990

[51] Int. Cl.$^5$ .............................................. D21B 1/08
[52] U.S. Cl. ....................... 162/4; 162/191; 241/20; 241/24; 209/3; 209/10; 209/173
[58] Field of Search ............... 209/3, 10, 173; 241/20, 241/24; 162/4, 5, 191

[56] References Cited

U.S. PATENT DOCUMENTS

| 3,284,282 | 11/1966 | Immel | 162/4 |
| 3,843,060 | 10/1974 | Colburns | 241/24 |
| 4,000,031 | 12/1976 | Acobas | 162/191 |
| 4,160,722 | 7/1979 | Marsh | 162/4 |
| 4,162,768 | 7/1979 | Froats | 162/4 |
| 4,332,748 | 6/1982 | Fremont | 162/5 |
| 4,436,104 | 3/1984 | Kashiwagi | 134/63 |

FOREIGN PATENT DOCUMENTS

| 695881 | 10/1964 | Canada | 162/4 |
| 3002061 | 7/1981 | Fed. Rep. of Germany | 241/20 |
| 1228276 | 4/1971 | United Kingdom | 162/4 |

OTHER PUBLICATIONS

Felton, A. J., "The Process and Economics of Polymer-Coated Wood Fiber Recovery", Tappi, May 1975, vol. 58, No. 5, pp. 71-73.

*Primary Examiner*—Richard V. Fisher
*Assistant Examiner*—Todd J. Burns
*Attorney, Agent, or Firm*—Ross, Howison, Clapp & Korn

[57] ABSTRACT

A method for reclaiming plastic and cellulosic fiber from plastic coated waste. The method includes the steps of introducing previously hydropulped plastic coated waste into a size reduction unit to reduce the plastic coated waste to a maximum dimension of about 1-4 inches. The plastic coated waste is then subject to flotation with agitation to separate the plastic from the cellulosic fiber. The cellulosic fiber is then screened, dried, and baled. The plastic is further reduced to a maximum dimension of about ½ inches and dewatered. The dewatered plastic is dried to a moisture content of less than 10% and rolled into plastic pellets. This method produces plastic pellets comprising from about 5 to about 10 weight percent cellulosic fiber and less than about 10 weight percent water from hydropulper plastic coating waste.

18 Claims, 1 Drawing Sheet

ND PAPER
RECYCLING PLASTIC COATED PAPER PRODUCT WASTE

TECHNICAL FIELD

This invention relates to recycling, and more particularly, to a method for recovering polyethylene and paper from the plastic coating waste generated by a primary or secondary hydropulper.

BACKGROUND OF THE INVENTION

The use of high viscosity, low density polyethylene as a coating material for paper products such as milk cartons is well known. During the manufacture of such plastic coated paper products, a variety of virgin scrap material such as roll ends, clippings and off-spec product is produced. This virgin scrap material is distinguished from post-consumer scrap that is subject to a greater degree of contamination.

Because of the relatively high quality of the bleached paper in the virgin scrap material, it is economically advantageous to reclaim it for use in products such as molded paper cups, trays, plates, egg cartons, and the like. Prior to reuse of the virgin scrap material, however, the polyethylene coating is desirably removed. In the first instance, this is done by grinding up the scrap and running it through a hydropulper.

In a hydropulper, the plastic is separated from a major portion of the paper and removed by flotation as an aqueous slurry. The plastic coating waste recovered from a hydropulper can typically comprise, for example, from about 6 to about 33 weight percent paper. The moisture content of the plastic coating waste usually varies in direct proportion to the amount of paper present in the waste because of the hydrophilic nature of paper.

In the past, the plastic coating waste from hydropulpers has been viewed as a discardable waste material. More recently, however, there has been increasing concern over the environmental impact of dumping such polymeric waste. Also, as the price of virgin plastic resins has increased, attention has been given to ways of further cleaning and purifying the plastic resin present in the polymeric waste recovered from hydropulpers.

The use of solvents for recovering polyethylene from a water wet mixture of water-insoluble materials containing a major portion of polyethylene and a minor portion of cellulosic pulp fibers is disclosed, for example, in U.S. 3,226,343.

More recently, a process for producing substantially fiber-free polyethylene pellets from hydropulper plastic coating waste has been disclosed in U.S. Pat. No. 4,332,748. That process discloses the use of tumble drying for dewatering and fiber removal, and also the plasticization of the polyethylene followed by water injection to achieve pellet formation. The polyethylene pellets made by this process comprise less than 5 weight percent fiber, and are preferably fiber-free so that they can be blended off with virgin resin for use in conventional plastic molding and extrusion applications.

Notwithstanding the processes disclosed in the prior art, however, a method is needed for reducing the paper fiber and moisture content of hydropulper plastic coating waste to a desirable level on a cost effective, commercial scale. More specifically, an economical and reliable method is needed for reducing the paper and moisture contents of such plastic coating waste to acceptable levels, preferably from about 5 to about 10 weight percent cellulosic fiber and less than about 10 weight water, and for pelletizing the resultant material.

SUMMARY OF THE INVENTION

According to the present invention, a new method is provided for reducing the cellulosic fiber and water content of hydropulper plastic coating waste, and for recovering recyclable plastic and paper. Unlike prior art processes, plastic pellets produced by the method disclosed herein are not intended for use in conventional plastic molding and extrusion operations where virgin resins, or combinations of virgin resin and substantially fiber-free regrind or off-spec resin, are normally employed. Instead, the plastic pellets produced according to the present invention are particularly well suited for use in making extruded composite products comprising a discontinuous phase of aligned cellulosic fibers dispersed in a continuous phase of polymeric resin.

According to one preferred embodiment of the invention, a method is provided for reducing the cellulosic fiber and moisture content of hydropulper plastic coating waste to less than about 10 weight percent of each without the use of solvents.

According to another preferred embodiment of the invention, a method is provided for producing polyethylene pellets comprising less than about 10 weight percent cellulosic fiber and less than about 10 weight percent water from plastic coating waste received from a hydropulper.

According to a particularly preferred embodiment of the invention, a method is provided for producing polyethylene pellets that comprise from about 5 to about 10 weight percent cellulosic fiber and less than about 8 weight percent water from hydropulper plastic coating waste.

According to another embodiment of the invention, a method is provided that comprises the steps of shredding polymeric coating waste comprising less than about 50 weight percent water; introducing the shredded waste into a water wash tank; recovering an aqueous slurry comprising polymeric coating waste from the surface of the wash tank; introducing the aqueous slurry of polymeric waste recovered from the wash tank into a wet granulator; discharging the granulated polymeric material from the wet granulator and introducing it into a dewatering auger; discharging the dewatered polymeric material onto a fluid bed belt drier; discharging the dried material into a pneumatic conveyor; pneumatically transporting the dried polymeric material through a cyclone for further fiber removal; introducing the plastic material discharged from the cyclone into intermediate storage; and thereafter recovering the plastic material from intermediate storage and rolling it into pellets comprising less than about 10 weight percent water and from about 5 weight percent to about 10 weight percent cellulosic fiber. Polymeric material recovered from the wash tank that comprises more than about 10 weight percent paper is preferably further fragmented in a dual attrition mill and transferred by slurry pump to a separation tank. Polymeric material recovered from the separation tank is introduced back into the dewatering auger together with material discharged from the wet granulator, while fibrous material recovered from the separation tank and from the wash tank is preferably dewatered on a vibratory screen, dried and baled.

BRIEF DESCRIPTION OF THE DRAWING

The method of the invention is further described and explained in relation to the following drawing wherein.

DESCRIPTION OF THE PREFERRED EMBODIMENTS

Figure 1:
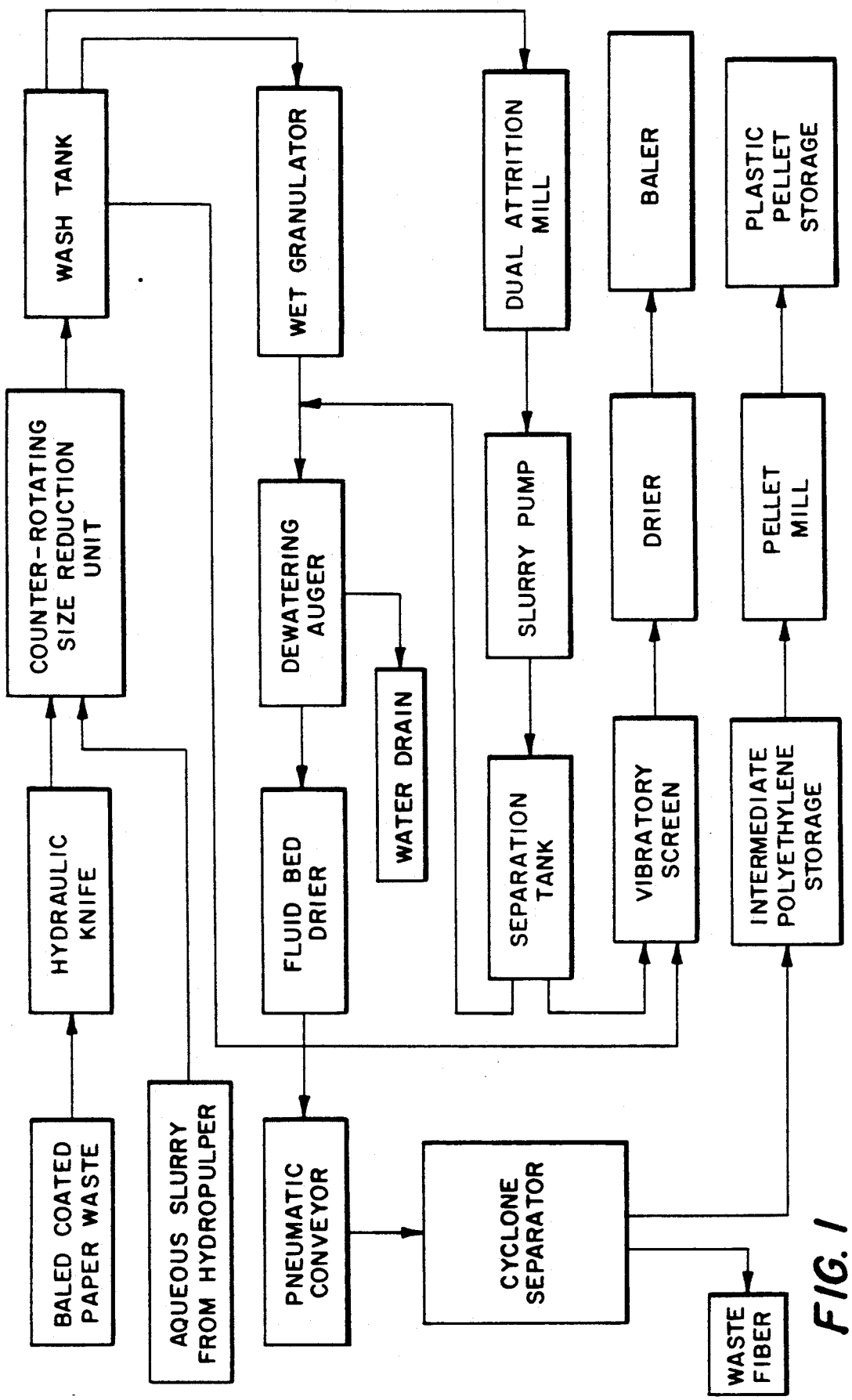
FIG. 1 depicts in simplified diagrammatic form a preferred embodiment of the method of the invention.

The feed material used in practicing the method of the invention is preferably polymeric coating waste obtained from either a primary or secondary hydropulper. Although the method of the invention is discussed herein in relation to a preferred embodiment wherein the polymeric waste material preferably comprises a major portion of high viscosity, low density polyethylene, it will be understood that other polymeric materials and combinations thereof can also be similarly processed according to the method of the invention.

Referring to FIG. 1, the polymeric coating waste feed material can take different forms, depending primarily upon the proximity of the polymeric waste recovery plant to the hydropulper from which the feed is obtained. If the hydropulper is nearby, plastic coating waste can be transferred to the polymeric waste recovery plant as an aqueous slurry. For longer hauls, the polymeric coating waste is preferably pressed and baled. Such bales typically comprise from about 40 to about 50 weight percent water due to the hydrophilic nature of the fibrous material.

If the polymeric coating waste is provided in slurry form, it is preferably introduced directly into a size reduction unit that preferably comprises counter-rotating, variable speed shafts having intermeshing radially extending members adapted to shred the material and pull the plastic from the paper. If the polymeric coating waste is provided in baled form, the bales are preferably sliced into segments approximately 6 inches wide by a hydraulically powered guillotine knife prior to introducing the material into the size reduction unit.

The counter-rotating shafts of the size reduction unit are preferably provided with spring-loaded slip clutches that will disengage if tramp waste materials not susceptible to fragmentation are encountered in the feed. According to a preferred embodiment of the invention, the size reduction unit will preferably reduce the clumps of polymeric coating waste to a size having a maximum dimension ranging between about 1 inch and about 4 inches.

The clumps of polymeric coating waste are preferably discharged from the size reduction unit into a wash tank. In the wash tank, further separation of plastic from paper is achieved, preferably through the combined use of agitation and water circulation. In the wash tank, paper, grit and tramp matter tend to settle to the bottom, while the plastic material floats to the surface and is removed, preferably by a rotating paddle wheel.

According to a particularly preferred embodiment of the invention, the plastic material recovered from the wash tank is further classified or divided into light and heavy fractions. Light fractions will generally contain less than about 10 weight percent paper, and heavy fractions will generally contain greater than about 10 weight percent paper.

Light fractions of plastic material are preferably fed into a wet granulator comprising blades adapted to agitate and wash the plastic while further reducing the particle size to a maximum dimension of about ½ inch. A stainless steel Black-Friar granulator can be satisfactorily utilized as the wet granulator in practicing the method of the invention. After wet granulation, the plastic material is dewatered, preferably through use of an upwardly inclined auger adapted to drain away excess water.

Heavy fractions of plastic material discharged from the wash tank are preferably fed through a diverter valve into a dual attrition disk mill that is adjustable as to rotational speed and spacing. Inside the disk mill, further separation of paper from plastic is achieved as the slurry is ground against internal pads and the average particle size is reduced to a maximum dimension of about ½ inch.

The slurry discharged from the disk mill is preferably injected by a slurry pump into the bottom of an oval-shaped separation tank having a longitudinally disposed baffle around which the aqueous slurry is circulated. Liberated plastic material floats to the top, is skimmed away, and is preferably fed to the dewatering auger in the same manner as previously discussed for light fractions.

Paper which settles to the bottom of the separation tank is preferably recovered by an inclined conveyor, dewatered, dried and baled. According to a preferred embodiment of the invention, the paper recovered from the separation tank is dewatered on a vibratory screener, optionally run through a filter press, and dried in a steam tube drier. The dried paper can then be stored in a holding bin until such time as enough paper has been accumulated to warrant baling. Paper recovered from the wash tank can also be fed to the vibratory screener, dried and baled in a similar manner if desired.

Dewatered light and heavy fractions discharged from the dewatering auger are preferably run through conventional squeeze rolls and dumped onto a fluidized bed belt drier. According to a preferred embodiment of the invention, the belt drier is variable speed, comprises a gas-fired blower adapted to circulate air heated to a temperature of up to about 180 degrees F. through the perforations in the belt, and further comprises a plurality of longitudinally spaced paddles extending transversely across the belt which help to carry the drying paper along the belt while the paper is subjected to an upwardly directed flow of hot air. Plastic material discharged from the fluid bed drier will preferably comprise less than about 10 weight percent water, most preferably, less than about 8 weight percent water.

From the fluid bed drier, the plastic material is preferably pneumatically transported to a cyclone separator where any remaining free waste fiber is removed. The plastic material is preferably discharged from the cyclone separator into an intermediate storage bin, where it is held until pelletized.

As used herein, the term "pelletized" refers to the manufacture of rolled pellets rather than extruded plastic pellets of the type ordinarily referred to in connection with virgin resins. The dried, reclaimed plastic material is preferably transported from intermediate storage and is fed to the pelletizer by a screw-type feeder. A low heat Sprout Waldron pellet mill can be satisfactorily used in pelletizing the plastic material recovered according to the process disclosed herein, and will minimize heat and physical degradation of the polymer.

The polymeric pellets (primarily high viscosity, low density polyethylene) produced according to the present process will preferably comprise less than about 10 weight percent, and most preferably about 5 weight percent cellulosic fiber. The processing required to achieve fiber contents of less than about 5 weight percent is generally not cost effective, and is not desirable when the plastic pellets are to be used in the production of extruded composites. In such composites, the minor portion of cellulosic fiber present in the plastic functions as a filler material that, when properly processed, can significantly increase the strength of the resultant extrudate.

Through use of the process disclosed herein, it is therefore possible to economically produce a useful polymeric product from previously discarded plastic coating waste and to simultaneously increase the percentage of paper recovered from coated paper scrap. An ancillary benefit of the subject process is a reduction in the need for wood that is achieved when the fiber-containing plastic pellets produced hereby are subsequently utilized in the production of composite building materials that can be substituted for natural wood products.

Other alterations, modifications and uses of the invention disclosed herein will likewise become apparent to those of ordinary skill in the art upon reading the present disclosure, and it is intended that the scope of the invention be limited only by the broadest interpretation of the appended claims to which the inventor is legally entitled.

We claim:

1. A method for reclaiming plastic from hydropulper plastic coated waste comprising plastic and cellulosic fiber, said method comprising the steps of:
   Introducing the plastic coated waste into a size reduction unit and reducing the plastic coated waste to particles having a maximum dimension ranging between about 1 inch and about 4 inches;
   Separating the plastic and a major portion of the cellulosic fiber by flotation with agitation;
   Further reducing the particle size of the plastic to a maximum dimension of about ½ inch;
   Dewatering the plastic;
   Drying the plastic to a moisture content of less than about 10 weight percent; and
   Rolling the plastic into pellets.

2. The method of claim 1 wherein the plastic coated waste introduced into the size reduction unit comprises from about 6 percent to about 33 percent cellulosic fiber by weight.

3. The method of claim 1 wherein the plastic coated waste introduced into the size reduction unit comprises less than about 50 percent water by weight.

4. The method of claim 3 wherein the hydropulper plastic coated waste is provided in bales that are segmented prior to entering the size reduction unit.

5. The method of claim 1 wherein the plastic coated waste is introduced into the size reduction unit as an aqueous slurry.

6. The method of claim 1 wherein the plastic is reduced to a maximum dimension of about ½ inch in a wet granulator.

7. The method of claim 1 wherein the plastic is dewatered by passing it through an inclined auger.

8. The method of claim 1 wherein the plastic is dried to a moisture content of less than about 10 weight percent by passing it over a fluid bed belt drier.

9. The method of claim 1 comprising the additional step of passing the dried plastic through a cyclone separator to remove an additional portion of the cellulosic fiber therefrom.

10. The method of claim 1 wherein the plastic pellets comprise from about 5 percent to about 10 percent cellulosic fiber by weight.

11. The method of claim 1 wherein the plastic pellets comprise less than about 8 percent moisture by weight 12. The method of claim 1 wherein the plastic is polyethylene.

13. The method of claim 1, further comprising a method for reclaiming the cellulosic fiber by recovering the cellulosic fiber that is separated from the plastic by the flotation with agitation.

14. The method of claim 13 comprising the additional step of screening the recovered cellulosic fiber.

15. The method claim 14 comprising the additional step of drying the screened cellulosic fiber.

16. The method of claim 15 comprising the additional step of baling the dried cellulosic fiber.

17. The method of claim 1 comprising the additional step of separating the plastic from a further portion of the cellulosic fiber by flotation subsequent to reducing the particle size to about ½ inch but prior to dewatering.

18. The method of claim 1 wherein the particle size of the plastic is reduced to a maximum dimension of about ½ inch in a disk mill.

* * * * *